United States Patent
Franzini et al.

(10) Patent No.: US 11,613,240 B2
(45) Date of Patent: Mar. 28, 2023

(54) MODEL-BASED AIRCRAFT BRAKE TEMPERATURE ESTIMATION

(71) Applicant: Goodrich Corporation, Charlotte, NC (US)

(72) Inventors: Giovanni Franzini, Cork City (IE); Matthew R. Pearson, Hartford, CT (US); Konda Reddy Chevva, Ellington, CT (US)

(73) Assignee: Goodrich Corporation, Charlotte, NC (US)

( * ) Notice: Subject to any disclaimer, the term of this patent is extended or adjusted under 35 U.S.C. 154(b) by 101 days.

(21) Appl. No.: 17/155,734

(22) Filed: Jan. 22, 2021

(65) Prior Publication Data

US 2021/0237708 A1    Aug. 5, 2021

(30) Foreign Application Priority Data

Feb. 5, 2020 (EP) .................................. 20155586

(51) Int. Cl.
| | |
|---|---|
| *B60T 17/22* | (2006.01) |
| *B64C 25/42* | (2006.01) |
| *B60T 5/00* | (2006.01) |
| *F16D 65/78* | (2006.01) |
| *F16D 66/00* | (2006.01) |

(52) U.S. Cl.
CPC ............ *B60T 17/221* (2013.01); *B64C 25/42* (2013.01); *B60T 5/00* (2013.01); *F16D 2065/783* (2013.01); *F16D 2066/001* (2013.01); *F16D 2066/006* (2013.01)

(58) Field of Classification Search
CPC ......... B60T 17/221; B60T 5/00; B64C 25/42; F16D 2065/783; F16D 2066/001; F16D 2066/006
See application file for complete search history.

(56) References Cited

U.S. PATENT DOCUMENTS

| | | | |
|---|---|---|---|
| 5,596,513 A | 1/1997 | Schricker | |
| 5,918,951 A * | 7/1999 | Rudd, III | ............ B60T 8/17616 303/112 |
| 6,220,676 B1 * | 4/2001 | Rudd, III | ................ B64C 25/44 303/112 |

(Continued)

FOREIGN PATENT DOCUMENTS

WO    2018099864    6/2018

OTHER PUBLICATIONS

EPO, European Search Report dated Jul. 10, 2020 in EP Application No. 20155586.9.

*Primary Examiner* — Pamela Rodriguez
(74) *Attorney, Agent, or Firm* — Snell & Wilmer L.L.P.

(57) ABSTRACT

A method for estimating the temperature of a component being monitored is described herein, comprising: inputting data related to the component being monitored into a brake thermal model; using the brake thermal model to predict a temperature of the component based on the input data; inputting a) actual temperature sensor measurement data of the component and b) the predicted temperature into an estimation algorithm, wherein the estimation algorithm combines the a) actual temperature sensor data and b) predicted temperature and generates an estimated brake temperature of the component based on the combined inputs. A computer-implemented system is also described.

14 Claims, 2 Drawing Sheets

(56) References Cited

U.S. PATENT DOCUMENTS

| | | | |
|---|---|---|---|
| 7,877,216 B2 * | 1/2011 | Wright | F16D 66/02 |
| | | | 701/33.9 |
| 8,041,490 B2 * | 10/2011 | DeVlieg | B60T 8/325 |
| | | | 701/3 |
| 8,151,944 B2 | 4/2012 | Waltz | |
| 8,942,903 B2 | 1/2015 | Friesen et al. | |
| 9,180,855 B2 | 11/2015 | Georgin | |
| 9,242,628 B2 | 1/2016 | Mylaraswamy et al. | |
| 9,738,264 B2 * | 8/2017 | Georgin | F16D 65/128 |
| 9,815,443 B2 | 11/2017 | Miller | |
| 10,124,782 B2 | 11/2018 | Georgin et al. | |
| 10,336,473 B2 | 7/2019 | Bill | |
| 10,352,774 B2 | 7/2019 | Miller | |
| 2015/0025735 A1 * | 1/2015 | Mylaraswamy | B64C 25/42 |
| | | | 701/32.9 |
| 2017/0305577 A1 | 10/2017 | Bill | |
| 2018/0297573 A1 | 10/2018 | Alam et al. | |
| 2019/0009769 A1 | 1/2019 | Antanaitis et al. | |
| 2019/0263510 A1 | 8/2019 | Bill et al. | |

\* cited by examiner

MODEL-BASED AIRCRAFT BRAKE TEMPERATURE ESTIMATION

CROSS-REFERENCE TO RELATED APPLICATIONS

This application claims priority to, and the benefit of, EP Application No. 20155586.9, entitled "MODEL-BASED AIRCRAFT BRAKE TEMPERATURE ESTIMATION," filed on Feb. 5, 2020, which is hereby incorporated by reference in its entirety.

FIELD

The present disclosure relates to a system and method for more accurately estimating a wheel brake temperature. The system and method may be used in the field of aircraft, as well as other vehicular technologies.

BACKGROUND

In the field of aircraft as well as other vehicles that may use brakes, temperature sensors are often used to measure the temperature of the brake producer. It has been found, however, that known systems may experience a discrepancy between the actual brake temperature and the temperature that is measured by the sensor. This may have significant disadvantages, since the temperature reading that is transmitted to the pilot of an aircraft may have an error of between 20° C. to 100° C. This is shown in Guy Di Santo "Proper operation of Carbon Brakes", 11$^{th}$ Airbus Performance and operations Conference, Jalisco, Mexico, March 2001.

The systems and methods described herein therefore aim to more accurately estimate the temperature of a braking producer for use in a vehicle such as an aircraft.

U.S. Pat. No. 10,336,473 B2 describes a brake cooling period prediction system. The system uses a torque sensor, a wear sensor and an environmental sensor to predict a cooling period required for the brake to reach a predetermined temperature following a braking event. U.S. Pat. No. 9,180,855 B2 describes systems and methods for estimating the cooling time of a brake assembly. U.S. Pat. No. 8,151,944 B2 describes system and device that uses an algorithm for estimating the amount of time need for a vehicle brake assembly to cool to a predetermined temperature. U.S. Pat. No. 10,124,782 B2 describes methods for estimating the cooling time of a brake assembly to a predetermined temperature. US 2018/0297573 A1 describes computing the ratio between input energy and the output energy and then comparing this value against a threshold to determine the status of health of the brake. U.S. Pat. No. 8,942,903 B3 describes a method for predicting the temperature of a wheel bearing.

SUMMARY

According to a first aspect, a method for estimating the temperature of a component being monitored is described herein comprising: inputting data related to the component being monitored into a brake thermal model; using said brake thermal model to predict a temperature of the component based on said input data; inputting a) actual temperature sensor measurement data of said component and b) said predicted temperature into an estimation algorithm, wherein said estimation algorithm combines said a) actual temperature sensor data and b) predicated temperature and generates an estimated brake temperature of said component based on said combined inputs.

In any of the examples described herein, the brake thermal model data related to the component being monitored may comprise any or all of the following: external temperature, brake pressure, wheel or brake rotors angular speed, friction coefficient of the braking surfaces, brake geometry, wind speed and direction, etc. The brake thermal model may also comprise a model of the brake cooling device, if installed, and hence include information regarding brake cooling system operation status and efficiency. In the case of cooling fans, this information may include fan speed, mass or volumetric flow rate and related temperature, etc.

In any of the examples described herein the component may be the brake assembly including stators and rotors and the brake thermal model data may be provided by a brake control unit.

In any of the examples described herein, the brake thermal model may be based on the analytical characterization of the brake assembly thermodynamics or on a simplified model derived from the same, for instance by means of linearization or model order reduction techniques.

In other examples, the brake thermal model may be a numerical model result from a simplification of the brake thermodynamics based on the analysis of data collected from the brake assembly.

In other examples, the brake thermal model may be a model designed by means of a software suitable for brake thermodynamics characterization and simulation, or may be a simplified numerical model derived by such simulation model.

In any of the examples described herein the estimation algorithm may have the form of a simple average.

In other examples, the estimation algorithm may have the form of a weighted average. The weighted average may be based on the accuracy of the different measurements and prediction available.

In some examples, the estimation algorithm may be based on a linear or non-linear Kalman filter.

In some examples the estimation algorithm is based on a weighted average estimation and on one brake temperature sensor and wherein $T_p$ denotes the brake temperature as predicted by the brake thermal model, $T_s$ denotes the brake temperature as measured by the brake temperature sensor, and $T_e$ denotes the brake temperature as predicted by the estimation algorithm. The weighted average estimation may be determined by performing the following steps of a) to i).

a) setting t=1 and initializing $T_p(0)$ and $T_e(0)$ and setting them equal to the current brake temperature $T_s(t)$ as measured by the brake temperature sensor, b) collecting current values of the measurements and parameters required by the brake thermal model:

$$m_1(t), \ldots, m_n(t), p_1, \ldots, p_m$$

c) predicting the current brake temperature $T_p(t)$ using the brake thermal model $f$:

$$T_p(t) = f(m_1(t), \ldots, m_n(t), p_1, \ldots, p_m)$$

d) estimating the accuracy $\varepsilon_p(t)$ of the predicted temperature by means of a function $f_{\varepsilon_p}$ based on the difference between the predicted and the estimated temperature computed at the previous sample time t−1:

$$\varepsilon_p(t) = f_{\varepsilon_p}(T_p(t-1) - T_e(t-1))$$

e) getting the current brake temperature $T_s(t)$ as measured by the brake temperature sensor f) estimating the accuracy $\varepsilon_s(t)$ of the brake temperature sensor reading by means of a function $f_{\varepsilon_s}$ based on the previous estimated temperature $T_e(t-1)$:

$$\varepsilon_s(t)=f_{\varepsilon_s}(T_e(t-1))$$

g) computing the weights $w_p(t)$ and $w_s(t)$ as follows:

$$w_p(t) = 1 - \frac{\varepsilon_p(t)}{\varepsilon_p(t) + \varepsilon_s(t)}, w_s(t) = 1 - w_p(t)$$

h) estimating the current brake temperature as follows:

$$T_e(t)=w_p(t)T_p(t)+w_s(t)T_s(t)$$

i) setting t=t+1 and going back to Step b).

In other examples, the estimation algorithm may have the form of a linear or nonlinear Kalman filter. The Kalman filter may also adapt any or all of its internal parameters according to the brake status and/or vehicle status and/or temperature sensors status.

A system for estimating the temperature of a component being monitored is also described herein, comprising control means that is adapted to perform any of the method steps described herein.

A system for estimating the temperature of a component being monitored is also described herein, comprising: control means configured to receive one or a plurality of input measurements; the control means being further configured to receive input data related to the component being monitored and configured to input said data into a brake thermal model; said controller being further configured to use said brake thermal model to predict a temperature of the component based on said input data; said controller being further configured to input a) actual temperature sensor measurement data of said component and b) said predicted temperature into an estimation algorithm, wherein said estimation algorithm combines said a) actual temperature sensor data and b) predicted temperature and generates an estimated brake temperature of said component based on said combined inputs, said controller being further configured to output said estimated brake temperature.

In some examples the brake thermal model data related to the component being monitored comprises any or all of external temperature, brake pressure, wheel or brake rotor angular speed, friction coefficient of braking surfaces, brake geometry, wind speed and direction, information regarding brake cooling system operation status and efficiency, fan speed, mass or volumetric flow rate and related temperature.

In some examples said component is a brake assembly and said brake thermal model data is provided by a brake control unit.

In some examples the estimation algorithm has the form of a simple average. In other examples the estimation algorithm has the form of a weighted average.

In some examples the weighted average is based on the accuracy of the different measurements and prediction available.

In some examples said actual temperature sensor measurement data of said component comprises data that is taken from multiple temperature sensors.

In some examples said component is a brake assembly within an aircraft and wherein at least one of the multiple sensors is/are located within the brake assembly, and/or wherein at least one of the multiple sensors is/are located in a part of the aircraft other than the brake assembly.

BRIEF DESCRIPTION OF THE DRAWINGS

Certain embodiments of the present disclosure will now be described in greater detail by way of example only and with reference to the accompanying drawings in which.

DETAILED DESCRIPTION

Figure 1:
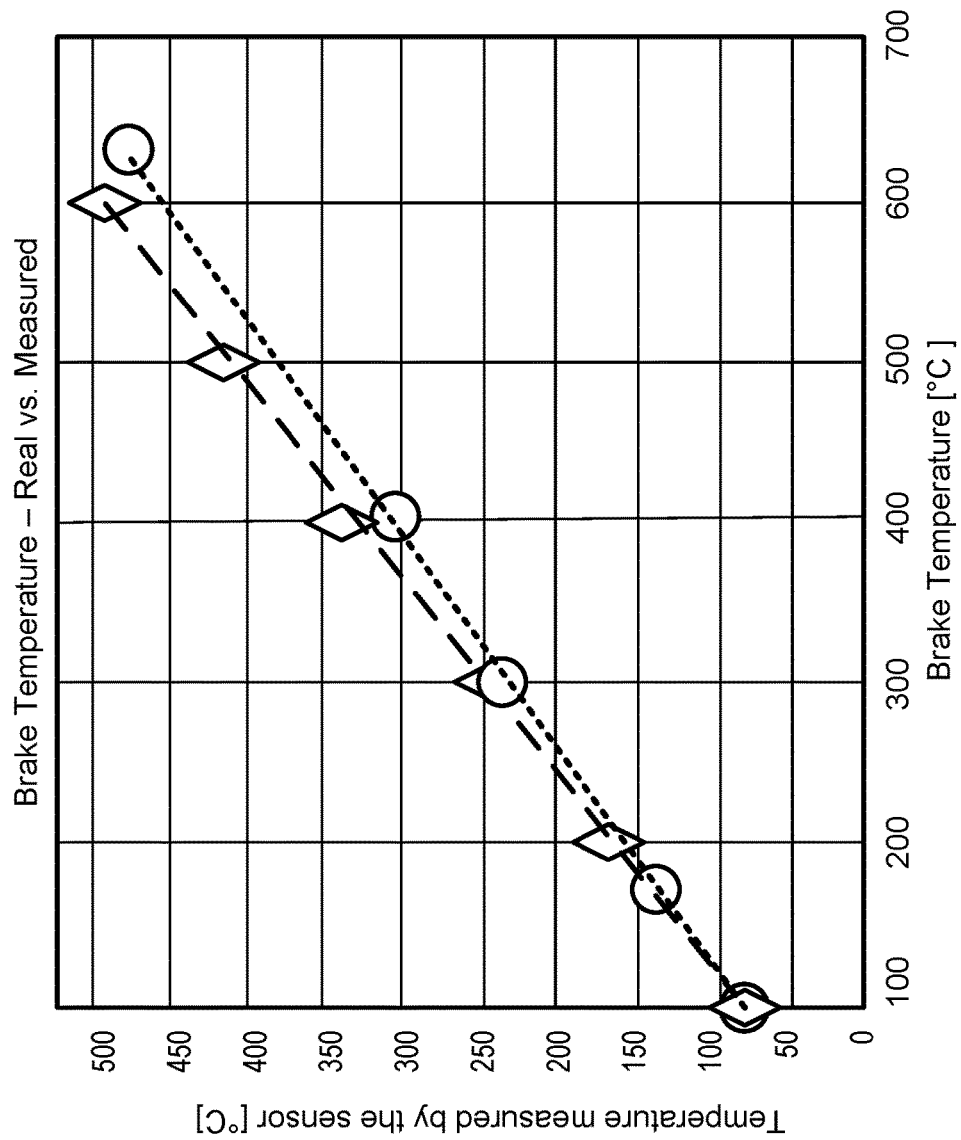
FIG. 1 shows a comparison between the real brake temperature and the temperature sensor readings according to known systems.

As described above, data from aircraft brake producers using known methods and systems may suffer from the drawback that there is a significant discrepancy between the actual brake temperature and the measurement acquired by the sensor. For reference, this is shown in FIG. 1, where the temperature measured by the sensor and the real brake temperature is compared, according to three different brake manufacturers.

According to this plot, it is seen that the error can range from 20° C. to 100° C., depending on the actual temperature of the brakes. This large error is due to 1) the temperature sensor position which is usually not in direct contact with the brake assembly and is more exposed to the environment with respect to the brakes rotors and stators; 2) the sensor delay that can be in the order of several minutes.

The methods and systems described herein allow for the more accurate estimation and determination of the temperature of a brake assembly. Specifically, model-based estimators are used to estimate the brake temperature by combining the measurements from the different temperature sensors available in combination with the prediction of a mathematical model representative of the brake thermodynamics.

Figure 2:
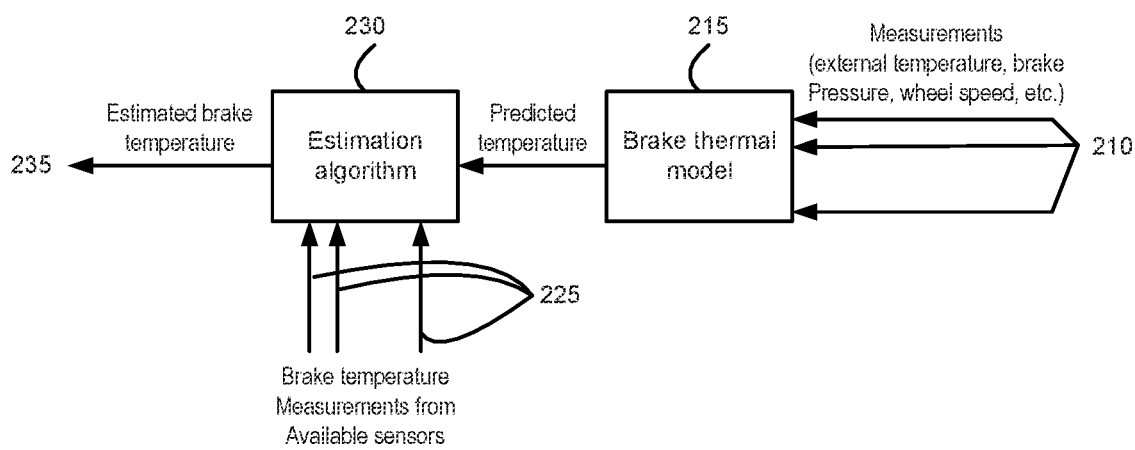
FIG. 2 depicts a flow diagram showing the features of the new methods and systems described herein for estimating brake temperature.

An example of this is shown in FIG. 2. As can be seen in this figure, the method for estimating the temperature of a brake assembly may comprise the following steps. First, a plurality of measurements 210 (or in some cases just one measurement) related to the brake assembly being monitored, (such as external temperature, brake pressure, wheel or brake rotors angular speed, friction coefficient of the braking surfaces, brake geometry, wind speed and direction, information regarding brake cooling system operation status and efficiency—e.g. in case of cooling fans information may include fan speed, mass or volumetric flow rate and related temperature, etc.) may be input into a brake thermal model. The brake thermal model 215 receives this input information and uses a mathematical model of the brake temperature dynamics to provide a predicted value of the brake temperature, as a function of the present and past inputs available.

These model inputs 210 can be measurements available by the brake control unit, such as brake pressure and wheel speed, and measurements collected by the avionics/ADIRU, such as external temperature, wind speed and directions, etc. The model can be obtained by analytical characterization of the brake temperature dynamics or can be inferred by means of model identification techniques from data collected through experiments or during aircraft operation.

Actual brake temperature measurements of the brake assembly being monitored are then measured using the available sensors 225. The predicted temperature 215 that was generated by the brake thermal model 215 is then combined with the actual measurements taken from the available sensors 225 using an estimation algorithm 230. The estimation algorithm 230 therefore uses a combination of the predicted temperature and the actual temperature measurements to compute a brake temperature estimate 235.

In some examples multiple temperature sensors may be used that are located in the brake assembly or in other places within the aircraft. The measurements taken from these multiple sensors can then be processed by the estimation algorithm according to their accuracy and/or position with respect to the brake assembly and/or the impact of the particular element monitored by each sensor on the brake assembly temperature.

The estimation algorithm 230 may have the form of a simple average or weighted average, the latter based on the accuracy of the different measurements and prediction available. More complex algorithms able to take advantage of the mathematical model can also be adopted. For instance, a Kalman filter (linear or extended in case the mathematical model is nonlinear) can be designed. In this case, the covariance of the different inputs available must be tuned according to the accuracy expected from the sensors. The covariance associated to the different inputs may also vary according to the current brake status and/or aircraft status and/or temperature sensors status.

In some examples a brake cooling system may be installed on a brake assembly that may use the method and system described herein. The effects of the cooling system may be taken into account by the mathematical model. An example of a cooling system may be a fan, however, other means of cooling are envisaged also. In examples where this is present, the mathematical model used for the estimation may explicitly take into account its effect on the brake temperature dynamics.

A possible algorithm implementing the method described herein, based on a weighted average estimation and on one brake temperature sensor is here presented. In the following, $T_p$ denotes the brake temperature as predicted by the brake thermal model, $T_s$ the brake temperature as measured by the brake temperature sensor, and $T_e$ the brake temperature as predicted by the estimation algorithm.

Step a. Set t=1 and initialize $T_p(0)$ and $T_e$ 0) setting them equal to the current brake temperature $T_s(t)$ as measured by the brake temperature sensor.

Step b. Collect current values of the measurements and parameters required by the brake thermal model:

$$m_1(t), \ldots m_n(t), p_1, \ldots, p_m$$

Step c. Predict the current brake temperature $T_p(t)$ using the brake thermal model $f$:

$$T_p(t)=f(m_1(t), \ldots, m_n(t), p_1, \ldots, p_m)$$

Step d. Estimate the accuracy $\varepsilon_p(t)$ of the predicted temperature by means of a function $f_{\varepsilon_p}$ based on the difference between the predicted and the estimated temperature computed at the previous sample time t−1:

$$\varepsilon_p(t)=f_{\varepsilon_p}(T_p(t-1)-T_e(t-1))$$

Step e. Get the current brake temperature $T_s(t)$ as measured by the brake temperature sensor.

Step f. Estimate the accuracy $\varepsilon_s(t)$ of the brake temperature sensor reading by means of a function $f_{\varepsilon_s}$ based on the previous estimated temperature $T_e(t-1)$:

$$\varepsilon_s(t)=f_{\varepsilon_s}(T_e(t-1))$$

Step g. Compute the weights $w_p(t)$ and $w_s(t)$ as follows:

$$w_p(t) = 1 - \frac{\varepsilon_p(t)}{\varepsilon_p(t) + \varepsilon_s(t)}, w_s(t) = 1 - w_p(t)$$

Step h. Estimate the current brake temperature as follows:

$$T_e(t)=w_p(t)T_p(t)+w_s(t)T_s(t)$$

Step i. Set t=t+1 and go to Step b.

This method may be implemented by a computer, or other control means. In some examples, a system may be provided that has a control means that is adapted to perform these method steps. For example, the system may comprise a controller that is configured to receive the plurality of input measurements 210. The control means may further be configured to input these measurements 210 into a brake thermal model 215 which calculates a predicted temperature 220 of the brake assembly being monitored. The control means may be further configured to combine the predicted temperature with temperature reading or readings taken by sensors associated with the brake assembly being monitored via the use of an estimation algorithm. The control means of the system may then be configured to provide an output of the estimated brake temperature 235 that has been calculated by the estimation algorithm.

The systems and methods described herein have been shown to provide a much more accurate estimation of the temperature of a brake assembly. A correct temperature measurement can drastically improve a brake's lifetime, aircraft operation safety and performance. Cooling time estimation algorithms can take advantage of the improved temperature estimation for providing accurate estimation, reducing aircraft turnaround time. Accuracy and delay problems affecting current brake temperature sensors are mitigated without any physical change to the aircraft.

Although the above examples have been described in relation to a brake assembly of an aircraft, this same technology may be used for other components wherein the accuracy of the temperature reading of the component may be important.

The invention claimed is:

1. A method for estimating the temperature of a component being monitored, comprising:
   inputting data related to the component being monitored into a brake thermal model;
   using said brake thermal model to predict the temperature of the component based on said input data;
   inputting actual temperature sensor measurement data of said component and said predicted temperature into an estimation algorithm,
   wherein said estimation algorithm combines said actual temperature sensor data and said predicted temperature and generates an estimated brake temperature of said component based on said combined inputs,
   wherein said estimation algorithm is based on a weighted average estimation and on one brake temperature sensor,
   wherein $T_p$ denotes the brake temperature as predicted by the brake thermal model, $T_s$ denotes the brake temperature as measured by the brake temperature sensor, and $T_e$ denote the brake temperature as predicted by the estimation algorithm, and
   wherein said weighted average estimation is determined by performing the steps of a) to i):
   a) setting t=1 and initializing $T_p(0)$ and $T_e(0)$ and setting them equal to the current brake temperature $T_s(t)$ as measured by the brake temperature sensor,
   b) collecting current values of the measurements and parameters required by the brake thermal model: $m_1(t), \ldots, m_n(t), p_1, \ldots, p_m$;

c) predicting the current brake temperature $T_p(t)$ using the brake thermal model $$f: T_p(t) = f(m_1(t), \ldots, m_n(t), p_1, \ldots, p_m),$$

d) estimating the accuracy $\varepsilon_p(t)$ of the predicted temperature by means of a function $f\varepsilon_p$ based on the difference between the predicted and the estimated temperature computed at the previous sample time t−1: $\varepsilon_p(t) = f\varepsilon_p (T_p(t-1) - T_e(t-1))$, e) getting the current brake temperature $T_s(t)$ as measured by the brake temperature sensor, f) estimating the accuracy $\varepsilon_s(t)$ of the brake temperature sensor reading by means of a function $f\varepsilon_s$ based on the previous estimated temperature $T_e(t-1)$:

$$\varepsilon_s(t) = f\varepsilon_s(T_e(t-1))$$

g) computing the weights $w_p(t)$ and $w_s(t)$ as follows:

$$w_p(t) = 1 - (\varepsilon_p(t)/(\varepsilon_p(t) + \varepsilon_s(t))), w_s(t) = 1 - w_p(t),$$

h) estimating the current brake temperature as follows:

$$T_e(t) = w_p(t) T_p(t) + w_s(t) T_s(t), \text{ and}$$

i) setting t=t+1 and going back to Step b).

2. The method of claim 1 wherein said brake thermal model data related to the component being monitored comprises any or all of external temperature, brake pressure, wheel or brake rotors angular speed, friction coefficient of the braking surfaces, brake geometry, wind speed and direction, information regarding brake cooling system operation status and efficiency, fan speed, mass or volumetric flow rate and related temperature.

3. The method of claim 1 wherein said component is a brake assembly and said brake thermal model data is provided by a brake control unit.

4. The method of claim 1 wherein the estimation algorithm has the form of a simple average, or wherein the estimation algorithm has the form of a weighted average, and wherein said weighted average is based on the accuracy of said actual temperature sensor data and said predicted temperature.

5. The method of claim 1 wherein said estimation algorithm has the form of a linear or nonlinear Kalman filter.

6. The method of claim 1 wherein said step of a) inputting actual temperature sensor measurement data of said component comprises inputting said data taken from multiple temperature sensors.

7. The method of claim 6 wherein said component is a brake assembly within an aircraft and wherein at least one of the multiple sensors is/are located within the brake assembly, and/or wherein at least one of the multiple sensors is/are located in a part of the aircraft other than the brake assembly.

8. A computer-implemented system for estimating the temperature of a component being monitored, comprising: control means adapted to perform the method of claim 1.

9. A system for estimating the temperature of a component being monitored, comprising:

control means configured to receive one or a plurality of input measurements;

the control means being further configured to receive input data related to the component being monitored and configured to input said data into a brake thermal model;

said control means being further configured to use said brake thermal model to predict the temperature of the component based on said input data;

said control means being further configured to input actual temperature sensor measurement data of said component and said predicted temperature into an estimation algorithm, wherein said estimation algorithm combines said actual temperature sensor data and said predicted temperature and generates an estimated brake temperature of said component based on said combined inputs, wherein said estimation algorithm is based on a weighted average estimation and on one brake temperature sensor, wherein $T_p$ denotes the brake temperature as predicted by the brake thermal model, $T_s$ denotes the brake temperature as measured by the brake temperature sensor, and $T_e$ denotes the brake temperature as predicted by the estimation algorithm, and wherein said weighted average estimation is determined by performing the steps of a) to i):

a) setting t=1 and initializing $T_p(0)$ and $T_e(0)$ and setting them equal to the current brake temperature $T_s(t)$ as measured by the brake temperature sensor, b) collecting current values of the measurements and parameters required by the brake thermal model: $m_1(t), \ldots, m_n(t), p_1, \ldots, p_m$, c) predicting the current brake temperature $T_p(t)$ using the brake thermal model $$f: T_p(t) = f(m_1(t), \ldots, m_n(t), p_1, \ldots, p_m),$$

d) estimating the accuracy $\varepsilon_p(t)$ of the predicted temperature by means of a function $f\varepsilon_p$ based on the difference between the predicted and the estimated temperature computed at the previous sample time t−1: $\varepsilon_p(t) = f\varepsilon_p (T_p(t-1) - T_e(t-1))$, e) getting the current brake temperature $T_s(t)$ as measured by the brake temperature sensor, f) estimating the accuracy $\varepsilon_s(t)$ of the brake temperature sensor reading by means of a function $f\varepsilon_s$ based on the previous estimated temperature $T_e(t-1)$:

$$\varepsilon_s(t) = f\varepsilon_s(T_e(t-1))$$

g) computing the weights $w_p(t)$ and $w_s(t)$ as follows:

$$w_p(t) = 1 - (\varepsilon_p(t)/(\varepsilon_p(t) + \varepsilon_s(t))), w_s(t) = 1 - w_p(t),$$

h) estimating the current brake temperature as follows:

$$T_e(t) = w_p(t) T_p(t) + w_s(t) T_s(t), \text{ and}$$

i) setting t=t+1 and going back to Step b); and said control means being further configured to output said estimated brake temperature.

10. The system of claim 9 wherein said brake thermal model data related to the component being monitored comprises any or all of external temperature, brake pressure, wheel or brake rotor angular speed, friction coefficient of braking surfaces, brake geometry, wind speed and direction, information regarding brake cooling system operation status and efficiency, fan speed, mass or volumetric flow rate and related temperature.

11. The system of claim 9 wherein said component is a brake assembly and said brake thermal model data is provided by a brake control unit.

12. The system of claim 9 wherein the estimation algorithm is based on a linear or non-linear Kalman filter, or has the form of a simple average, or wherein the estimation algorithm has the form of a weighted average, and wherein the weighted average is based on the accuracy of said actual temperature sensor data and said predicted temperature.

13. The system of claim 9 wherein said actual temperature sensor measurement data of said component comprises data taken from multiple temperature sensors.

14. The system of claim 13 wherein said component is a brake assembly within an aircraft and wherein at least one of the multiple sensors is/are located within the brake assembly, and/or wherein at least one of the multiple sensors is/are located in a part of the aircraft other than the brake assembly.

\* \* \* \* \*